United States Patent
Chai et al.

(10) Patent No.: US 9,883,250 B2
(45) Date of Patent: Jan. 30, 2018

(54) SYSTEM AND METHOD OF DISPLAYING CONTENT AND RELATED SOCIAL MEDIA DATA

(71) Applicant: OpenTV, Inc, San Francisco, CA (US)

(72) Inventors: Crx Chai, Oakland, CA (US); Alex Fishman, San Francisco, CA (US); Isaac Chellin, San Francisco, CA (US)

(73) Assignee: OPENTV, INC., San Francisco, CA (US)

( * ) Notice: Subject to any disclaimer, the term of this patent is extended or adjusted under 35 U.S.C. 154(b) by 248 days.

(21) Appl. No.: 14/260,677

(22) Filed: Apr. 24, 2014

(65) Prior Publication Data

US 2015/0074552 A1 Mar. 12, 2015

Related U.S. Application Data

(60) Provisional application No. 61/876,188, filed on Sep. 10, 2013, provisional application No. 61/876,199, filed on Sep. 10, 2013.

(51) Int. Cl.
| | |
|---|---|
| *G06F 3/048* | (2013.01) |
| *H04N 21/482* | (2011.01) |
| *H04N 21/4788* | (2011.01) |
| *H04L 29/08* | (2006.01) |
| *H04N 21/431* | (2011.01) |

(52) U.S. Cl.
CPC ........... *H04N 21/482* (2013.01); *H04L 67/12* (2013.01); *H04L 67/2804* (2013.01); *H04N 21/4312* (2013.01); *H04N 21/4788* (2013.01); *H04N 21/4821* (2013.01); *H04N 21/4826* (2013.01)

(58) Field of Classification Search
None
See application file for complete search history.

(56) References Cited

U.S. PATENT DOCUMENTS

| | | |
|---|---|---|
| 5,812,123 A | 9/1998 | Rowe et al. |
| 7,353,235 B2 | 4/2008 | Sally et al. |
| 7,739,604 B1 * | 6/2010 | Lyons ............ G06F 3/0486 709/213 |

(Continued)

FOREIGN PATENT DOCUMENTS

| | | |
|---|---|---|
| CN | 106462316 A | 2/2017 |
| EP | 2490454 A2 | 8/2012 |

(Continued)

OTHER PUBLICATIONS

International Search Report and Written Opinion for PCT/US2014/054702 dated Nov. 19, 2014, 7 pp.

(Continued)

*Primary Examiner* — Hua Lu
(74) *Attorney, Agent, or Firm* — Schwegman Lundberg & Woessner, P.A.

(57) ABSTRACT

A device for enabling content selection is configured to display one or more item of content with associated popularity indicator. The popularity indicators may be based on usage data from a social media service. The popularity indicators may indicate a rate of change in popularity as well as a relative level popularity. In one example, a device may display comments from a social media service in conjunction with content during the playback of content.

15 Claims, 10 Drawing Sheets

(56) References Cited

U.S. PATENT DOCUMENTS

| | | | |
|---|---|---|---|
| 7,801,419 B2* | 9/2010 | Sakai | G06F 3/04817 386/241 |
| 8,230,360 B2 | 7/2012 | Ma et al. | |
| 8,429,530 B2* | 4/2013 | Neuman | G06F 3/04815 715/716 |
| 9,009,768 B2* | 4/2015 | Agnihotri | G08C 17/00 709/246 |
| 9,135,333 B2* | 9/2015 | Cameron | G06F 17/30029 |
| 9,595,300 B2* | 3/2017 | Duffin | G11B 27/105 |
| 9,678,623 B2* | 6/2017 | Neuman | G06F 3/04817 |
| 2002/0059593 A1 | 5/2002 | Shao et al. | |
| 2002/0112239 A1 | 8/2002 | Goldman | |
| 2003/0236695 A1* | 12/2003 | Litwin, Jr. | G06Q 10/06 705/7.29 |
| 2007/0061745 A1 | 3/2007 | Anthony et al. | |
| 2007/0192794 A1 | 8/2007 | Curtis et al. | |
| 2007/0220543 A1 | 9/2007 | Shanks et al. | |
| 2008/0134053 A1 | 6/2008 | Fischer | |
| 2010/0071000 A1 | 3/2010 | Amento et al. | |
| 2010/0201618 A1 | 8/2010 | Lorente | |
| 2010/0235745 A1 | 9/2010 | Shintani | |
| 2011/0175867 A1* | 7/2011 | Satake | H04N 5/44591 345/204 |
| 2011/0283189 A1 | 11/2011 | McCarty | |
| 2011/0289189 A1* | 11/2011 | Bartholomew | G06F 17/30053 709/217 |
| 2011/0289422 A1* | 11/2011 | Spivack | G06Q 30/02 715/739 |
| 2011/0320715 A1* | 12/2011 | Ickman | G06Q 30/02 711/118 |
| 2012/0060094 A1 | 3/2012 | Irwin et al. | |
| 2012/0311453 A1 | 12/2012 | Reyna et al. | |
| 2013/0066885 A1* | 3/2013 | Komuves | G06Q 10/10 707/748 |
| 2013/0073988 A1* | 3/2013 | Groten | G06Q 30/02 715/753 |
| 2013/0086159 A1* | 4/2013 | Gharachorloo | G06Q 50/01 709/204 |
| 2013/0152129 A1 | 6/2013 | Alberth et al. | |
| 2013/0204825 A1* | 8/2013 | Su | G06N 5/04 706/46 |
| 2013/0212493 A1* | 8/2013 | Krishnamurthy | H04L 65/403 715/753 |
| 2014/0052785 A1 | 2/2014 | Sirpal | |
| 2014/0068689 A1 | 3/2014 | Sirpal et al. | |
| 2014/0365873 A1* | 12/2014 | Willis | G06F 17/212 715/243 |
| 2015/0006280 A1* | 1/2015 | Ruiz | G06Q 30/00 705/14.45 |
| 2015/0074721 A1 | 3/2015 | Fishman et al. | |
| 2015/0074728 A1 | 3/2015 | Chai et al. | |
| 2015/0206269 A1* | 7/2015 | Qin | G06F 17/2235 715/202 |

FOREIGN PATENT DOCUMENTS

| | | |
|---|---|---|
| WO | WO-2015038515 A1 | 3/2015 |
| WO | WO-2015038516 A1 | 3/2015 |

OTHER PUBLICATIONS

"U.S. Appl. No. 14/242,459, Advisory Action dated Sep. 2, 2015", 6 pgs.

"U.S. Appl. No. 14/242,459, Appeal Brief filed Dec. 4, 2015", 17 pgs.

"U.S. Appl. No. 14/242,459, Applicant's Summary of Examiner Interview filed Sep. 15, 2015", 2 pgs.

"U.S. Appl. No. 14/242,459, Applicant's Summary of Examiner Interview filed Nov. 17, 2015", 4 pgs.

"U.S. Appl. No. 14/242,459, Decision on Pre-Appeal Brief Request dated Nov. 4, 2015", 4 pgs.

"U.S. Appl. No. 14/242,459, Examiner Interview Summary dated Mar. 3, 2015", 3 pgs.

"U.S. Appl. No. 14/242,459, Examiner Interview Summary dated Jul. 21, 2015", 3 pgs.

"U.S. Appl. No. 14/242,459, Examiner Interview Summary dated Nov. 17, 2015", 3 pgs.

"U.S. Appl. No. 14/242,459, Examiner's Answer to Appeal Brief dated Jul. 12, 2016", 18 pgs.

"U.S. Appl. No. 14/242,459, Final Office Action dated Jun. 19, 2015", 21 pgs.

"U.S. Appl. No. 14/242,459, Non Final Office Action dated Jan. 5, 2015", 11 pgs.

"U.S. Appl. No. 14/242,459, Pre-Brief Conference request filed Sep. 15, 2015", 5 pgs.

"U.S. Appl. No. 14/242,459, Response filed Feb. 19, 2015 to Non Final Office Action dated Jan. 5, 2015", 9 pgs.

"U.S. Appl. No. 14/242,459, Response filed Jul. 21, 2015 to Final Office Action dated Jun. 19, 2015", 11 pgs.

"U.S. Appl. No. 14/336,758, Advisory Action dated Mar. 9, 2016", 3 pgs.

"U.S. Appl. No. 14/336,758, Appeal Brief filed May 20, 2016", 18 pgs.

"U.S. Appl. No. 14/336,758, Examiner's Answer to Appeal Brief dated Jul. 12, 2016", 13 pgs.

"U.S. Appl. No. 14/336,758, Final Office Action dated Nov. 25, 2015", 11 pgs.

"U.S. Appl. No. 14/336,758, Non Final Office Action dated Jan. 29, 2015", 10 pgs.

"U.S. Appl. No. 14/336,758, Non Final Office Action dated Jul. 23, 2015", 10 pgs.

"U.S. Appl. No. 14/336,758, Reply Brief filed Aug. 31, 2016", 4 pgs.

"U.S. Appl. No. 14/336,758, Response filed Feb. 25, 2016 to Final Office Action dated Nov. 25, 2015", 5 pgs.

"U.S. Appl. No. 14/336,758, Response filed Apr. 28, 2015 to Non Final Office Action dated Jan. 29, 2015", 10 pgs.

"U.S. Appl. No. 14/336,758, Response filed Sep. 22, 2015 to Non Final Office Action dated Jul. 23, 2015", 14 pgs.

"European Application Serial No. 14843569.6, Extended European Search Report dated Mar. 6, 2017", 10 pgs.

"European Application Serial No. 14843569.6, Response filed Oct. 26, 2016 to Communication pursuant to Rules 161(2) and 162 EPC dated Apr. 22, 2016", 9 pgs.

"European Application Serial No. 14844441.7, Extended European Search Report dated Mar. 2, 2017", 10 pgs.

"European Application Serial No. 14844441.7, Response filed Oct. 26, 2016 to Communication pursuant to Rules 161(2) and 162 EPC dated Apr. 19, 2016", 7 pgs.

"International Application Serial No. PCT/US2014/054701, International Preliminary Report on Patentability dated Mar. 24, 2016", 8 pgs.

"International Application Serial No. PCT/US2014/054701, International Search Report dated Jan. 12, 2015", 2 pgs.

"International Application Serial No. PCT/US2014/054701, Written Opinion dated Jan. 12, 2015", 6 pgs.

"International Application Serial No. PCT/US2014/054702, International Preliminary Report on Patentability dated Mar. 24, 2016", 6 pgs.

"U.S. Appl. No. 14/336,758, Appeal Decision dated May 17, 2017", 6 pgs.

"U.S. Appl. No. 14/336,758, Notice of Allowance dated Aug. 1, 2017", 8 pgs.

"U.S. Appl. No. 14/336,758, Notice of Allowance dated Sep. 14, 2017", 8 pgs.

"European Application Serial No. 14843569.6, Response filed Sep. 20, 2017 to Extended European Search Report dated Mar. 6, 2017", 12 pgs.

"European Application Serial No. 14844441.7, Response filed Sep. 20, 2017 to Extended European Search Report dated Mar. 2, 2017", 45 pgs.

* cited by examiner

SYSTEM AND METHOD OF DISPLAYING CONTENT AND RELATED SOCIAL MEDIA DATA

This application claims the benefit of U.S. Provisional Application No. 61/876,199, filed on Sep. 10, 2013, and U.S. Provisional Application No. 61/876,188 filed on Sep. 10, 2013 each of which are incorporated by reference in their respective entirety.

TECHNICAL FIELD

The present disclosure relates to the field of interactive television and graphical user interfaces.

BACKGROUND

Digital media playback capabilities may be incorporated into a wide range of devices, including digital televisions, including so-called "smart" televisions, laptop or desktop computers, tablet computers, e-book readers, personal digital assistants (PDAs), digital recording devices, digital media players, video gaming devices, digital cameras, cellular or satellite radio telephones, including so-called "smart" phones, dedicated video streaming devices, and the like. Digital media content may originate from a plurality of sources including, for example, over-the-air television providers, satellite television providers, cable television providers, online media-sharing services, online media streaming services, peer devices, and the like.

Due to the wide range of content users may access on their televisions and secondary connected devices, traditional techniques for the organizing, sorting, and displaying available content choices may be less than ideal. For example, the presentation of content within a traditional digital cable television system has typically been displayed and organized with static sorting methods. That is, there are typically no indications made to the user of the global popularity of each piece of content.

SUMMARY

The following brief summary is not intended to include all features and aspects of the present invention, nor does it imply that the invention must include all features and aspects discussed in this summary. The present disclosure relates to the field of graphical user interfaces and more specifically describes techniques for presenting a user with a dynamic interactive graphics experience. In particular, this disclosure describes techniques for navigating and displaying content based on popularity and/or social media data related to content. In some examples, the techniques may be implemented in a device with digital media playback capabilities, including for example, set top boxes and televisions.

According to one example of the disclosure, a method for enabling content selection comprises displaying a plurality of information windows wherein each information window is respectively associated with an item of available content, and for each of the plurality of information windows, displaying a popularity indicator wherein a popularity indicator indicates a rate at which an item of content is changing in popularity, and enabling a user to select one of the plurality of information windows.

According to another example of the disclosure, a device for enabling content selection comprises one or more processors configured to display a plurality of information windows wherein each information window is respectively associated with an item of available content, and for each of the plurality of information windows, display a popularity indicator, wherein a popularity indicator indicates a rate at which an item of content is changing in popularity, and enable a user to select one of the plurality of information windows.

According to another example of the disclosure an apparatus for enabling content selection comprises means for displaying a plurality of information windows wherein each information window is respectively associated with an item of available content, and means for displaying a popularity indicator for each of the plurality of information windows, wherein a popularity indicator indicates a rate at which an item of content is changing in popularity, and means for enabling a user to select one of the plurality of information windows.

According to another example of the disclosure a non-transitory computer-readable storage medium has instructions stored thereon that upon execution cause one or more processors of a device to display a plurality of information windows wherein each information window is respectively associated with an item of available content, and for each of the plurality of information windows, display a popularity indicator wherein a popularity indicator indicates a rate at which an item of content is changing in popularity, and enable a user to select one of the plurality of information windows.

The details of one or more examples are set forth in the accompanying drawings and the description below. Other features, objects, and advantages will be apparent from the description and drawings, and from the claims.

DETAILED DESCRIPTION

Devices with digital media playback capabilities, including televisions, set top boxes, and mobile devices, may be configured to provide users thereof with graphical user interfaces that enable the selection of content, including content originating from one or more of over-the-air television providers, satellite television providers, cable television providers, online media-sharing services, and online media streaming services. In some examples, these graphical user interfaces may be referred to as electronic program guides (EPGs). Traditional electronic program guides typically display and organize content according to static sorting methods. For example, traditional electronic program guides may simply list available on demand movies alphabetically. Traditional electronic programming guides may provide no indication of the global popularity of content and do not integrate social media content with other types of content. According to examples techniques described herein, the selection of content may be facilitated and the viewing of content may be enhanced by incorporating social media content and information originating therefrom within an electronic program guide.

Described herein are systems and methods for presenting content to a user based on related social media data. Some embodiments extend to a machine-readable medium embodying instructions which, when executed by a machine, cause the machine to perform any one or more of the methodologies described herein. Other features will be apparent from the accompanying drawings and from the detailed description that follows. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
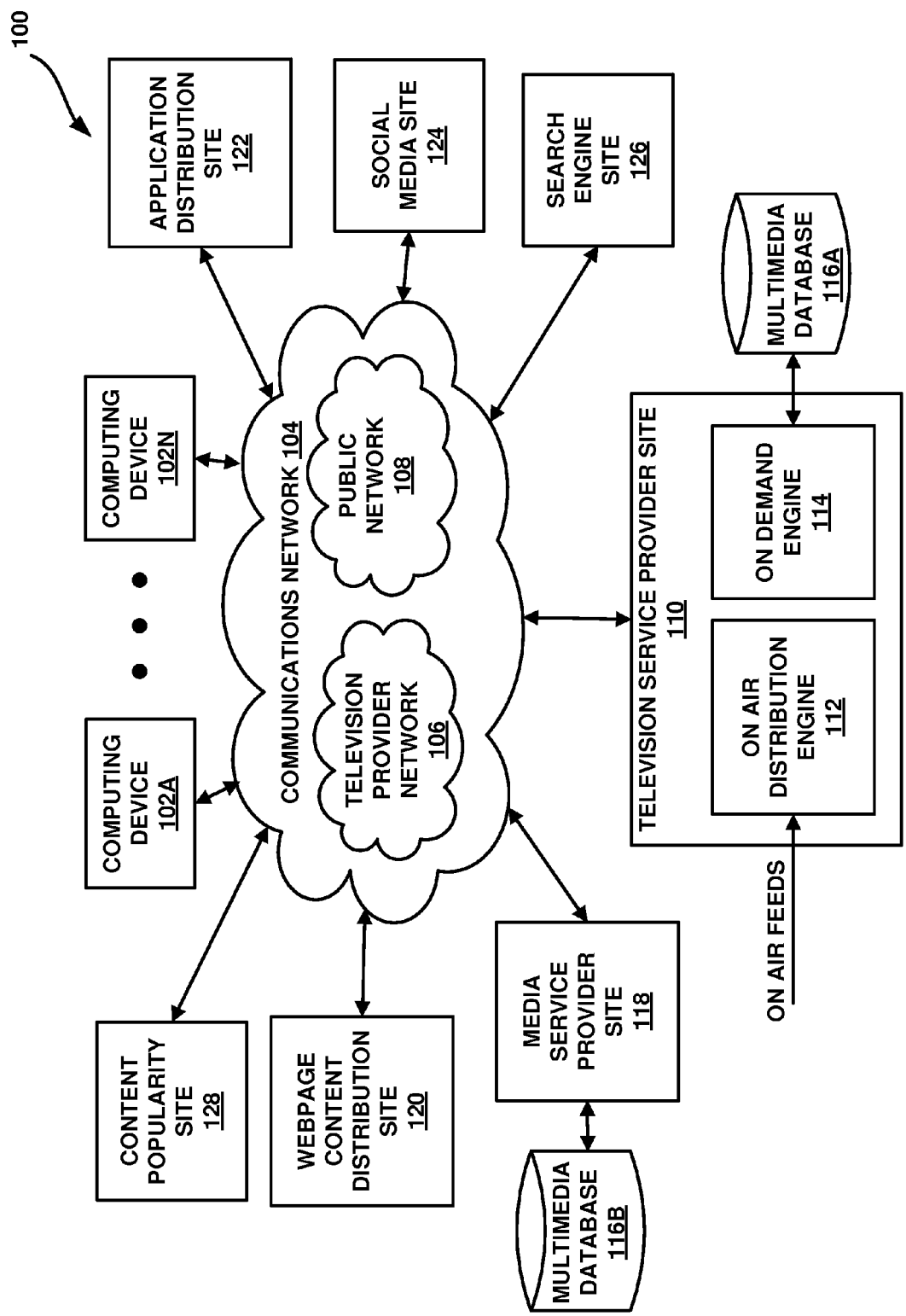
FIG. 1 is block diagram illustrating an example of a system that may implement one or more techniques described in this disclosure.

FIG. 1 is block diagram illustrating an example of a system that may implement one or more techniques described in this disclosure. System 100 may be configured to enable content selection in accordance with the techniques described herein. In the example illustrated in FIG. 1, system 100 includes one or more computing devices 102A-102N, communications network 104, television service provider site 110, media service provider site 118, webpage content distribution site 120, application distribution site 122, social media site 124, search engine site 126, and content popularity site 128. System 100 may include software modules operating on one or more servers. Software modules may be stored in a memory and executed a processor. Servers may include one or more processors and a plurality of internal and/or external memory devices. Examples of memory devices include file servers, FTP servers, network attached storage (NAS) devices, local disk drives, or any other type of device or storage medium capable of storing data. Storage medium may include Blu-ray discs, DVDs, CD-ROMs, flash memory, or any other suitable digital storage media. When the techniques described herein are implemented partially in software, a device may store instructions for the software in a suitable, non-transitory computer-readable medium and execute the instructions in hardware using one or more processors.

System 100 represents an example of a system that may be configured to allow digital content, such as, for example, music, videos, images, webpages, messages, voice communications, and applications, to be distributed to and accessed by plurality of computing devices, such as computing devices 102A-102N. In the example illustrated in FIG. 1, computing devices 102A-102N may include any device configured to transmit data to and/or receive data from communication network 104. For example, computing devices 102A-102N may be equipped for wired and/or wireless communications and may include set top boxes, digital video recorders, televisions, desktop, laptop, or tablet computers, gaming consoles, mobile devices, including, for example, "smart" phones, cellular telephones, and personal gaming devices. It should be noted that although example system 100 is illustrated as having distinct sites, such an illustration is for descriptive purposes and does not limit system 100 to a particular physical architecture. Functions of system 100 and sites included therein may be realized using any combination of hardware, firmware and/or software implementations.

Communications network 104 may comprise any combination of wireless and/or wired communication media. Communications network 104 may include coaxial cables, fiber optic cables, twisted pair cables, wireless transmitters and receivers, routers, switches, repeaters, base stations, or any other equipment that may be useful to facilitate communications between various devices and sites. Communications network 104 may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and IEEE standards, such as, for example, one or more of the 802 standards.

As illustrated in FIG. 1, networks of different types may be defined within communications network 104. Networks may be defined according physical and/or logical aspects. For example, networks that share the same physical infrastructure (e.g., coaxial cables) may be distinguished based on a primary service type (e.g., webpage access or television service). Physical and logical aspects of networks may be described according to a layered model. For example, layers of a model may respectively define physical signaling, addressing, channel access control, packet properties, and data processing in a communications system. One example of a layered model is the Open Systems Interconnection (OSI) model. In the example illustrated in FIG. 1, communications network 104 includes television provider network 106 and public network 108. It should be noted that although television provider network 106 and public network 108 are illustrated as distinct, television provider network 106 and public network 108 may share physical and/or logical aspects.

Television provider network 106 is an example of a network configured to provide a user with television services. For example, television provider network 106 may include public over-the-air television networks, public or subscription-based satellite television service provider networks, and public or subscription based cable television provider networks. It should be noted that although in some examples television provider network 106 may primarily be used to provide television services, television provider network 106 may also provide other types of data and services according to any combination of the telecommunication protocols described herein.

Public network 108 is an example of a packet-based network, such as, a local area network, a wide-area network, or a global network, such as the Internet, configured to provide a user with World Wide Web based services. Public network 108 may be configured to operate according to Internet Protocol (IP) standards. It should be noted that although in some examples public network 108 may primarily be used to provide access to hypertext web pages, public network 108 may also provide other types of media content according to any combination of the telecommunication protocol described herein.

Referring again to FIG. 1, television service provider 110 represents an example of a television service provider site. Television service provider 110 may be configured to provide computing devices 102A-102N with television service. For example, television service provider 110 may be a public broadcast station, a cable television provider, or a satellite television provider and may be configured to provide television services to analog and/or digital televisions and set top boxes. In the example illustrated in FIG. 1, television service provider 110 includes on air distribution engine 112 and on demand engine 114. On air distribution engine 112 may be configured to receive a plurality of on air feeds and distribute the feeds to computing devices 102A-102N through television provider network 106. For example, on air distribution engine 112 may be configured to receive one or more over-the-air television broadcasts via a satellite uplink/downlink and distribute the over-the-air television broadcasts to one or more users of a subscription-based cable television service.

On demand engine 114 may be configured to access a multimedia library and distribute multimedia content to one or more of computing devices 102A-102N through television provider network 106. For example, on demand engine 114 may access multimedia content (e.g., music, movies, and TV shows) stored in multimedia database 116A and provide a subscriber of a cable television service with movies on a Pay Per View (PPV) basis. Multimedia database 116A may be a storage device configured to store multimedia content. It should be noted that multimedia content accessed through on demand engine 114 may also be located at various sites within system 100 (e.g., peer-to-peer distribution). In one example, on demand engine 114 may be configured to generate usage data associated with available content. For example, on demand engine 114 may track the number of times available items of content are requested by users during a particular time period. For example, on demand engine 114 may track the number of times a particular movie was requested during the past 24 hours.

Further, on demand engine 114 may be configured to track the number of times a particular item of content was requested by a subset of users of computing devices 102A-102N. For example, on demand engine 114 may be configured to track the number of times a particular movie was requested by users within a particular metropolitan area. In one example, television service provider site 110 may be configured such that users are able to define subsets of users. For example, television service provider site 110 may be configured such that a user is able to include his or her colleagues in one or more subsets. For example, a user may be able to include close acquaintances in a first subset and casual acquaintances in a second subset. As described in detail below, content popularity site 128 may generate an On Demand Requests Value based on the number of times an item of content was requested by one or more subsets users of television service provider site during a particular time period.

Media service provider site 118 represents an example of a multimedia service provider. Media service provider site 118 may be configured to access a multimedia library and distribute multimedia content to one or more of computing devices 102A-102N through public network 108. For example, media service provider site 118 may access multimedia (e.g., music, movies, and TV shows) stored in multimedia database 116B and provide a user of a media service with multimedia. Multimedia database 116B may be a storage device configured to store multimedia content. In one example, media service provider site 118 may be configured to provide content to one or more of computing devices 102A-102N using the Internet protocol suite. In some examples, a media service may be referred to as a streaming service. Commercial examples of media services may include Hulu, YouTube, Netflix, and Amazon Prime.

As described above, television provider network 106 and public network 108 may share physical and logical aspects. Thus, content accessed by one or more of computing devices 102A-102N through media service provider site 118 may be transmitted through physical components of television provider network 106. For example, a user of a computing device may access the internet and multimedia content provided by a media service through a cable modem connected to a coaxial network maintained by a cable television provider. In some examples, media service provider site 118 may be configured to generate usage data associated with available content. For example, media service provider site 118 may track the number of times available items of content are requested by users during a particular time period.

In a manner similar to that described above with respect to on demand engine 114, media service provider site 118 may be configured to track the number of times a particular item of content was requested by a subset of users of computing devices 102A-102N. In one example, media service provider site 118 may be configured such that users are able to define subsets of users. As described in detail below, content popularity site 128 may generate a Media Service Requests Value based on the number of times an item of content was requested by one or more subsets users of media service provider site 118 during a particular time period.

Webpage content distribution site 120 represents an example of a webpage service provider. Webpage content distribution site 120 may be configured to provide hypertext based content to one or more of computing devices 102A-102N through public network 108. It should be noted that hypertext based content may include audio and video content. Hypertext content may be defined according to programming languages, such as, for example, Hypertext Markup Language (HTML), Dynamic HTML, and Extensible Markup Language (XML). Examples of webpage content distribution sites include the Wikipedia website and the United States Patent and Trademark Office website. Webpage content may also include webpages providing usage data associated with particular items of content. For example, webpage content may include a movie review website where a number of users are able to provide comments with respect to particular movies. In one example, webpage content may include a list of top 50 movie rentals during a particular period. For example, the Home Media Magazine website provides a list of the top movie rentals during a weekly period. As described in detail below content popularity site 128 may generate a Rentals Value based the ranking of an item of content in a top movie rental list during a particular time period.

Application distribution site 122 represents an example of an application distribution service. Application distribution site 122 may be configured to distribute developed software applications to one or more of computing devices 102A-102N. In one example, software applications may include games and programs operable on computing devices. In other examples, software applications may be configured to allow a computing device to access content provided by a site in manner specific to the computing device. For example, software applications may be configured to provide enhanced or reduced functionality of a webpage to a mobile device or a set top box. Software applications may be developed using a specified programming language. Examples of programming languages include, Java™, Jini™, C, C++, Perl, UNIX Shell, Visual Basic, and Visual Basic Script. In some examples, developers may write software applications using a software development kit (SDK) provided by a device manufacturer or a service provider.

In the example where one or more of computing devices 102A-102N are mobile devices, application distribution site 122 may be maintained by a mobile device manufacturer, a service provider, and/or a mobile device operating system provider. In the example where one or more of computing devices 102A-102N are set top boxes, application distribution site 108 may be maintained by a set top box manufacturer, a service provider, and/or an operating system provider. In some examples, an application distribution site may be referred to as an app store. Examples of commercially available application distribution sites include Google Play, the Apple App Store, BlackBerry World, Windows Phone Store, and the Amazon Appstore.

Social media site 124 represents an example of a social media service. Social media site 124 may be configured to allow users of computing devices 102A-102N to communicate with one another. Social media site 124 may be configured to host profile pages corresponding to users of computing devices 102A-102N. For example, social media site 124 may be configured such that users of computing devices 102A-102N are able to display messages and upload photos, videos, and other media to a user's profile page. Further, social media site 124 may be configured to enable users of computing devices 102A-102N to comment on particular items of content. For example, users of computing devices 102A-102N may be able to endorse a television show or a movie. Examples of commercially available social media sites include Facebook, YouTube, Linkedin, Google Plus, Twitter, Flickr, and Instagram.

In addition to allowing users to maintain profile pages, social media site 124 may be configured to generate usage data based on information included in user profile pages and/or user activity. For example, social media site 124 may be configured to track the popularity of a movie or television show based on comments provided by users of computing devices 102A-102N. As described in detail below, the techniques described herein may allow users of computing devices 102A-102N to incorporate functions of social media sites to share content and recommendations with other users. For example, users may chat and interact with one another during the playback of content. Further, content may be presented to a user based on whether content was endorsed by one or more other users.

In one example, social media site 124 may include Facebook and the popularity of a particular item of content may be based on a number of "likes" and/or the number of users "talking about" a particular piece of content during a particular time period. In one example, social media site 124 may include Twitter and the popularity of a particular item of content may be based on the number of tweets including an identifier associated with a particular item of content during a particular time period. It should be noted that in some examples, an indicator of social media popularity may be based on data provided by a social media aggregation service. An example of a commercially available social media aggregation service includes Twitter Counter. As described in detail below content popularity site 128 may generate a Social Media Value based social media activity associated with an item of content.

Search engine site 126 represents an example of a content search service. Search engine site 126 may be a service configured to allow users of computing devices 102A-102N to search for content available through communications network 104. Search engine site 126 may be configured to receive queries from computing devices 102A-102N and provide a list of search results to computing devices 102A-102N. For example, search engine site 126 may be configured such that users of computing devices 102A-102N are presented with a webpage including a search query field and are able to search content based on keywords. Examples of commercially available search engine sites include Google, Bing, and Yahoo! Further, search engine site 126 may be configured to generate usage data based on information included in search queries. For example, search engine site 126 may be configured to track the popularity of a movie and/or television show based on the number of times a query related to the movie and/or television is provided by users of computing devices 102A-102N. For example, a search query with respect to a particular actress may generate usage data for one or more items of content associated with the actress. In one example, search engine site 126 may provide a list of the top search requests during a particular period. As described in detail below content popularity site 128 may generate a Search Requests Value based on the ranking of an item of content in a top search request list during a particular time period.

As described above, on demand engine 114 and media service provider site 118 may generate usage data associated with available content based on the number of times content is accessed. As further described above, webpage content distribution site 128, social media site 124, and search engine site 126 may generate usage data associated with available content based on additional user activity. Content popularity site 128 represents an example of a site configured to receive a list of available content and usage data associated with available content and determine the popularity of items of content. It should be noted that although content popularity site 128 is illustrated in FIG. 1 as a distinct site, in some examples, content popularity site 128 may be included as part of television service provider site 110. Further, in some examples, one or more functions described with respect to content popularity site 128 may be performed by computing devices 102A-102N.

In one example, content popularity site 128 may generate a list of content available to one or more of computing devices 102A-102N by receiving a list of all available or viewable content from television service provider site 110 and/or media service provider site 118. Content popularity site 128 may receive usage data from one or more of the sources described above. That is, content popularity site 128 may be configured to receive multiple types of usage data from multiple sources and generate a popularity value for a particular piece of content. In one example, after generating a list of available content, content popularity site 128 may poll specified social media sites, webpage content distribution sites, and/or search engine sites for usage data with respect to available content. In one example, the usage data may be comprised of any text, image, audio or video associated with an item of content and may be stored on content popularity site 128.

Content popularity site 128 may aggregate usage data and correlate usage data to each piece of content in a list of available or viewable content. In one example, content popularity site 128 calculates a popularity ranking for items of content based on the aggregated data. In one example, the popular ranking may be a numeric value. In one example, the numeric value indicating the popularity ranking may be referred to as a "buzz factor." In one example, a popularity ranking may be calculated based on the number of endorsements an item of content has received on various social networks and websites. It should be noted that each social network or website may have differing types of usage data and may measure usage using different metrics. As such, content popularity site 128 may be configured to run an algorithm to determine relevant endorsements and filter out extraneous usage data.

In one example, an algorithm may include a weighted sum where a scaling factor is applied to each source of data. Each scaling factor may be based on a particular user's level of activity with a social media site, search engine, and/or a webpage content distribution site. For example, content popularity site 128 may determine that a user accesses a particular movie review site on a regular basis and does not access a particular social media site on a regular basis. Thus, content popularity site 128 may be configured to apply a higher scaling factor for the particular movie review site than the particular social media site (i.e., give the movie review site more importance when determining popularity). In one another example, content popularity site 128 may select a scaling factor for sources of usage data based on the proximity of an endorsement to a user. That is, endorsements from users of a social media service that are more closely connected to a user (e.g., within immediate list of contacts v. a general user of a social media site) may be associated with a higher scaling factor.

In one example, a user of a computing device may be able to set scaling factors directly or indirectly based on personal preferences. For example, a user may be able to select the sources from which usage data is aggregated and/or how scaling factors are determined. For example, a user may be able to specific that content popularity site 128 only use immediate contacts of a user for particular social media service when determining a ranking. Content popularity distribution site 128 may be configured to store preference information provided by a user and generate a numeric value indicating popularity based on user preferences.

In one example, content popularity site 128 may generate the one or more of the following values for use in a weighted sum to determine a buzz factor: On Demand Requests Value, Media Service Requests Value, Rentals Value, Social Media Value, Search Requests Value, where On Demand Requests Value is based on usage data from on air distribution engine 112, Media Service Requests Value is based on usage data from media service provider site 118, Rentals Value is based on the ranking of an item of content in a top movie rental list during a particular time period, where Social Media Value is based social media activity associated with an item of content from social medial site 124, and Search Requests Value is based on the ranking of an item of content in a top search request list during a particular time period from search engine site 126. In one example, each of the values may be normalized to a common range (e.g., 1 to 50). For example, 10,000 endorsements for a particular an item content may normalized to be equivalent to 100 requests for the particular item of content. Further, in one example, scaling factors based on a user's level of activity and/or personal preferences may be an integer from zero to five. In this manner, in this example, a buzz factor may range from 0 to 1250 (i.e., 5(50)+5(50)+5(50)+5(50)+5(50)).

As described in detail below, the presentation of available content within a graphical user interface may be based on a buzz factor. Thus, an algorithm used to determine a buzz factor and the frequency at which a buzz factor is updated may be selected such that the presentation of available content within a graphical user interface varies in a manner that will make a user more of less likely to select a particular item of content. For example, a buzz factor and the frequency at which a buzz factor is updated may be selected such that in a typical case, a buzz factor has a variance of 25% during a ten second interval.

In one example, content popularity site 128 may provide ranking values to one or more of computing devices 102A-102N, media service provider site 118, and/or television service provider site 110. In one example, content popularity site 128 may return a popularity value to a computing device upon receive a request from a computing device. In one example, content popularity site 128 may collect and aggregate the usage data in real time and push data updates to a computing device. As described in detail below, computing devices 102A-102N may be configured to display and/or sort available content based on popularity rankings. Further, computing devices 102A-102N may be configured to display and/sort content by individual user endorsements. In one example, a computing device may display actual social data in chronological order along with the real time content and social media updates.

Figure 2:
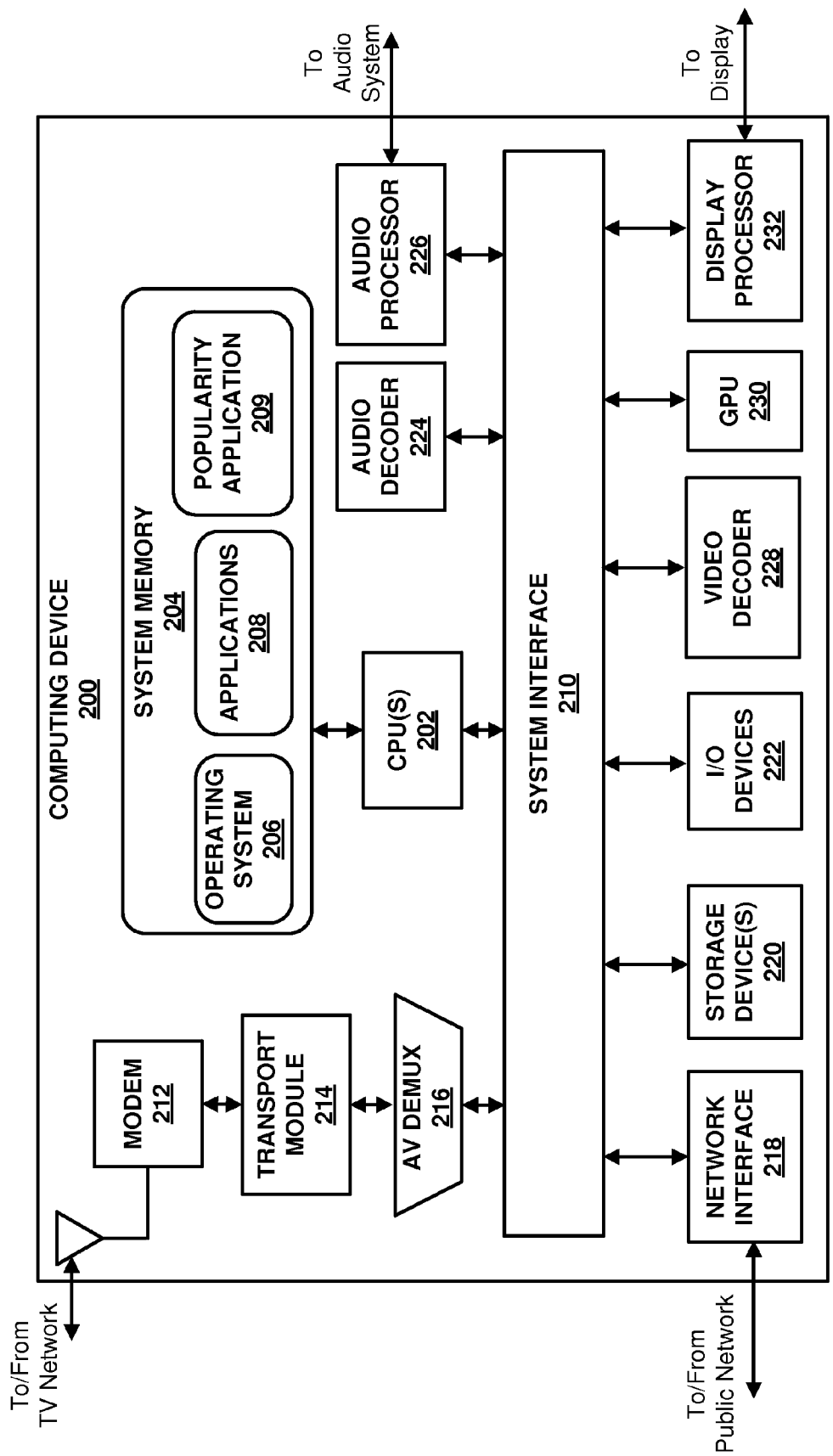
FIG. 2 is a block diagram illustrating an example of a computing device that may implement one or more techniques of this disclosure.

FIG. 2 is a block diagram illustrating an example of a computing device that may implement one or more techniques of this disclosure. Computing device 200 is an example of a computing device that may be configured to transmit data to and receive data from a communications network, allow a user to access multimedia content, and execute one or more applications. Computing device 200 may include or be part of a stationary computing device (e.g., a desktop computer, a television, a set-top box, a gaming console, a dedicated multimedia streaming device, or a digital video recorder), a portable computing device (e.g., a mobile phone, a laptop, a personal digital assistant (PDA), or a tablet device) or may be or included as part of another computing device. In the example illustrated in FIG. 2, computing device 200 is configured to send and receive data via a television network, such as, for example, television network 106 described above and send and receive data via a public network, such as, for example, public network 108. It should be noted that in other examples, computing device 200 may be configured to send and receive data through one of a television network 106 or a public network 108. The techniques described herein may be utilized by devices configured to communicate using any and all combinations of communications networks.

As illustrated in FIG. 2, computing device 200 includes central processing unit(s) 202, system memory 204, system interface 210, modem 212, transport module 214, AV demux 216, network interface 218, storage devices 220, I/O devices 222, audio decoder 224, audio processor 226, video decoder 228, graphics processing unit 230, and display processor 232. As illustrated in FIG. 2, system memory 106 includes operating system 206, applications 208, and popularity application 209. Each of processor(s) 202, system memory 204, system interface 210, modem 212, transport module 214, AV demux 216, network interface 218, storage devices 220, I/O devices 222, audio decoder 224, audio processor 226, video decoder 228, graphics processing unit 230, and display processor 232 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although example computing device 200 is illustrated as having distinct functional blocks, such an illustration is for descriptive purposes and does not limit computing device 200 to a particular hardware architecture. Functions of computing device 200 may be realized using any combination of hardware, firmware and/or software implementations.

CPU(s) 202 may be configured to implement functionality and/or process instructions for execution in computing device 200. CPU(s) 202 may be capable of retrieving and processing instructions, code, and/or data structures for implementing one or more of the techniques described herein. Instructions may be stored on a computer readable medium, such as system memory 204 or storage devices 220. CPU(s) 202 may include multi-core central processing units.

System memory 204 may be described as a non-transitory or tangible computer-readable storage medium. In some examples, system memory 204 may provide temporary and/or long-term storage. In some examples, system memory 204 or portions thereof may be described as non-volatile memory and in other examples portions of system memory 204 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories.

System memory 204, may be configured to store information that may be used by computing device 200 during operation. System memory 204 may be used to store program instructions for execution by CPU(s) 202 and may be used by software or applications running on computing device 200 to temporarily store information during program execution. For example, system memory 204 may store instructions associated with operating system 206, applications 208, and popularity application 209. Applications 208 and popularity application 209 may include applications implemented within or executed by computing device 200 and may be implemented or contained within, operable by, executed by, and/or be operatively/communicatively coupled to components of computing device 200. Applications 208 and popularity application 209 may include instructions that may cause CPU(s) 202 of computing device 200 to perform particular functions. Applications 208 and popularity application 209 may include algorithms which are expressed in computer programming statements, such as, for-loops, while-loops, if-statements, do-loops, etc. Applications 208 and popularity application 209 may be distributed to computing device 200 through an application distribution site, such as, for example, application distribution site 122 described above.

As further illustrated in FIG. 2, applications 208 and popularity application 209 may execute in conjunction with operating system 206. That is, operating system 206 may be configured to facilitate the interaction of applications 208 and popularity application 209 with CPUs(s) 202, and other hardware components of computing device 200. It should be noted that in some examples, components of operating system 206 and components acting in conjunction with operating system 206 may be referred to as middleware. Further, in some examples, popularity application 209 may include an application programming interface (API). The techniques described herein may be utilized by devices configured to operate using any and all combinations of software architectures. Operating system 206 may be an operating system designed to be installed on laptops, desktops, smartphones, tablets, set-top boxes, digital video recorders, televisions and/or gaming devices. In one example, operating system 206 may include one or more of operating systems or middleware components developed by OpenTV, Windows® operating systems, Linux operation systems, Mac operating systems, Android operating systems, and any and all combinations thereof.

System interface 210, may be configured to enable communications between components of computing device 200. In one example, system interface 210 comprises structures that enable data to be transferred from one peer device to another peer device or to a storage medium. For example, system interface 210 may include a chipset supporting Accelerated Graphics Port ("AGP") based protocols, Peripheral Component Interconnect (PCI) bus based protocols, such as, for example, the PCI Express™ ("PCIe") bus specification, which is maintained by the Peripheral Component Interconnect Special Interest Group, or any other form of structure that may be used to interconnect peer devices.

Storage devices 220 represent memory of computing device 200 that may be configured to store relatively larger amounts of information for relatively longer periods of time than system memory 204. For example, in the example where computing device 200 is included as part of a digital video recorder, storage devices 220 may be configured to store numerous video files. Similar to system memory 204, storage device(s) 220 may also include one or more non-transitory or tangible computer-readable storage media. Storage device(s) 220 may include internal and/or external memory devices and in some examples may include volatile and non-volatile storage elements. Examples of memory devices include file servers, an FTP servers, network attached storage (NAS) devices, a local disk drive, or any other type of device or storage medium capable of storing data. Storage medium may include Blu-ray discs, DVDs, CD-ROMs, flash memory, or any other suitable digital storage media.

I/O devices 222 may be configured to receive input and provide output during operation of computing device 200. Input may be generated from an input device, such as, for example, a push-button remote control, a motion based remote control, a device including a touch-sensitive screen, a device including a track pad, a mouse, a keyboard, a microphone, video camera, a motion sensor, or any other type of device configured to receive input. In one example, an input device may include an advanced user input device, such as a smart phone or a tablet computing device. For example, an input device may be a secondary computing device and may be configured to receive user input via touch gestures, buttons on the secondary computing device, and/or voice control. Further, in some examples, an input device may include a display that is configured to display the graphical users interfaces described herein. For example, in the case where computing device 200 includes a television, an input device may include a smart phone in communication with the television. In this example, a user may provide commands to a television by activating portions of a graphical user interface displayed on a smart phone. Output may be provided to output devices, such as, for example internal speakers, an integrated display device, and/or external components, such as, a secondary computing device. In some examples, I/O device(s) 222 may be operatively coupled to computing device 200 using a standardized communication protocol, such as for example, Universal Serial Bus protocol (USB), Bluetooth, ZigBee or a proprietary communications protocol, such as, for example, a proprietary infrared communications protocol.

In the example illustrated in FIG. 2, computing device 200 is configured to send and receive data via a television network, such as, for example, television network 106 described above and send and receive data via a public network, such as, for example, public network 108. As described above, a communications network may be described based on a model including layers that define communication properties, such as, for example, physical signaling, addressing, channel access control, packet properties, and data processing in a communications system. In the example illustrated in FIG. 2, modem 212, transport module 214, and AV demux 216 may be configured to perform lower layer processing associated with television network 106 and network interface 218 may be configured to perform lower layer processing associated with public network 108.

In one example, modem 212 may be configured to perform physical signaling, addressing, and channel access control according to the physical and MAC layers utilized in a television provider network, such as for example, television provider network 106. In one example, modem 212 may configured to receive signals from a coaxial cable and/or an over the air signal and perform low level signal processing (e.g., demodulation). In one example, modem 212 may be configured to extract transport streams from signals received from a coaxial cable. In one example, a transport stream may be based on a transport stream defined by the Moving Pictures Experts Group (MPEG). In one example, a transport stream may include a plurality of program streams where each program stream respectively corresponds to a program available from a television network. Further, a transport stream may include a plurality of data streams (e.g., Program Map Table and EPG data).

Transport module 214 may be configured to receive data from modem 212 and process received data. For example, transport model 214 may be configured to receive a transport stream including a plurality of program streams and extract individual program streams from a received transport stream. In one example, a program stream may include a video stream, an audio stream, and a data stream. AV demux 216 may be configured to receive data from transport module 214 and process received data. For example, AV demux 216 may be configured to receive a program stream from transport module 214 and extract audio packets, video packets, and data packets. That is, AV demux 216 may apply demultiplexing techniques to separate video streams, audio streams, and data streams from a program stream. In one example, AV demux 216 may be configured to decapsulate packetized elementary video and audio streams from a transport stream defined according to MPEG-2 Part 1. It should be noted that although modem 212, transport module 214, and AV demux 216 are illustrated as having distinct functional blocks, the functions performed by modem 212, transport module 214, and AV demux 216 may be highly integrated and realized using any combination of hardware, firmware and/or software implementations.

Network interface 218 may be configured to enable computing device 200 to send and receive data via a public network. As described above, data sent or received via a public network may include data associated digital content, such as, for example, music, videos, images, webpages, messages, voice communications, and applications. Network interface 218 may include a network interface card, such as an Ethernet card, an optical transceiver, a radio frequency transceiver, or any other type of device configured to send and receive information. Network interface 218 may be configured to perform physical signaling, addressing, and channel access control according to the physical and MAC layers utilized in a public network, such as for example, public network 108. Further, in a manner similar to that described above with respect to transport module 214 and A/V demux 216, network interface 218 may be configured to extract audio packets, video packets, and data packets from a data stream. For example, network interface 218 may be configured to extract video packets, audio packets, and data packets according to one or more of internet protocol (IP), transport control protocol (TCP), real time streaming protocol (RTSP), user datagram protocol (UDP), real time protocol (RTP), MPEG transport stream protocols, and IPTV protocols. It should be noted, that the techniques described herein are generally applicable to any and all methods of digital content distribution and are not limited to particular communications network implementations. For example, the techniques described herein may be applicable to digital content originating from one or more of a broadcast, a multicast, a unicast, an over the top content source, a personal video recorder (PVR), and a peer-to-peer content source.

Referring again to FIG. 2, data associated with digital content, such as, for example, music, videos, images, webpages, messages, voice communications, and applications may be stored in a computer readable medium, such as, for example, system memory 204 and storage devices 220. Data stored in a memory device may be retrieved and processed by CPU(s) 202, audio decoder 224, audio processor 226, video decoder 228, graphics processing unit 230, and display processor 232. As described above, CPU(s) 202 may be capable of retrieving and processing instructions, code, and/or data structures for implementing one or more of the techniques described herein. Each of audio decoder 224, audio processor 226, video decoder 228, graphics processing unit 230, and display processor 232 may also be capable of retrieving and processing instructions, code, and/or data structures for implementing one or more of the techniques described herein.

Audio decoder 224 may be configured to retrieve and process coded audio data. For example, audio decoder 224 may be a combination of hardware and software used to implement aspects of audio codec. Audio data may be coded using multi-channel formats such as those developed by Dolby and Digital Theater Systems. Audio data may be coded using a compressed or uncompressed format. Examples of compressed audio formats include MPEG-1, 2 Audio Layers II and III, AC-3, AAC, and Ogg Vorbis. An example of an uncompressed audio format includes pulsecode modulation (PCM) audio format. Audio processor 226 may be configured to retrieve captured audio samples and may process audio data for output to an audio system (not shown). In some examples, audio processor 226 may include a digital to analog converter. An audio system may comprise any of a variety of audio output devices such as headphones, a single-speaker system, a multi-speaker system, or a surround sound system.

Video decoder 228 may be configured to retrieve and process coded video data. For example, video decoder 228 may be a combination of hardware and software used to implement aspects of video codec. In one example, video decoder 228 may be configured to decode video data encode according to any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8 and High-Efficiency Video Coding (HEVC).

As described above, a device with media playback capabilities may provide a graphical user interface (e.g., an EPG) that enables a user to select content. A graphical user interface may include images and graphics displayed in conjunction with video content (e.g., playback icons overlaid on a video). Graphics processing unit 230 is an example of a dedicated processing unit that may be configured to generate graphical user interfaces including the graphical user interfaces described herein. That is, graphics processing unit 230 may be configured to receive commands and content data and output pixel data. Graphic processing unit 230 may operate according to a graphics pipeline process (e.g., input assembler, vertex shader, geometry shader, rasterizer, pixel shader, and output merger). Graphics processing unit 203 may include multiple processing cores and may be configured to operate according to OpenGL (Open Graphic Library, managed by the Khronos Group) and/or Direct3D (managed by Microsoft, Inc.).

Display processor 232 may be configured to retrieve and process pixel data for display. For example, display processor 232 may receive pixel data from video decoder 228 and/or graphics processing unit 230 and output data for display. Display processor 232 may be coupled to a display, such display 250 (not shown in FIG. 1) using a standardized communication protocol (e.g., HDMI, DVI, DisplayPort, component video, composite video, and/or VGA). Display 250 may comprise one of a variety of display devices such as a liquid crystal display (LCD), a plasma display, an organic light emitting diode (OLED) display, or another type of display device capable of presenting video data to a user. Display 250 may include a standard definition television, a high definition television, or an ultra-resolution display. Further, display 250 may include an integrated display of a portable computing device (e.g., a mobile phone, a laptop, a personal digital assistant (PDA), or a tablet device). As described above, in some examples, a portable computing device may operate as an I/O device for a stationary computing device.

As described above, content popularity site 128 may provide ranking values to one or more of computing devices. Computing device 200 may be configured to display and/or sort available content based on popularity rankings. That is, computing device 200 may be configured to receive popularity ranking and enable the selection of content by providing one or more of the graphical user interfaces described herein. In one example, popularity application 209 may be configured to generate one or more graphical user interfaces based on popularity rankings. FIGS. 3-9 are a conceptual diagrams illustrating examples of graphical user interfaces that may be generated by a computing device in accordance with one or more techniques of this disclosure.

Figure 3:
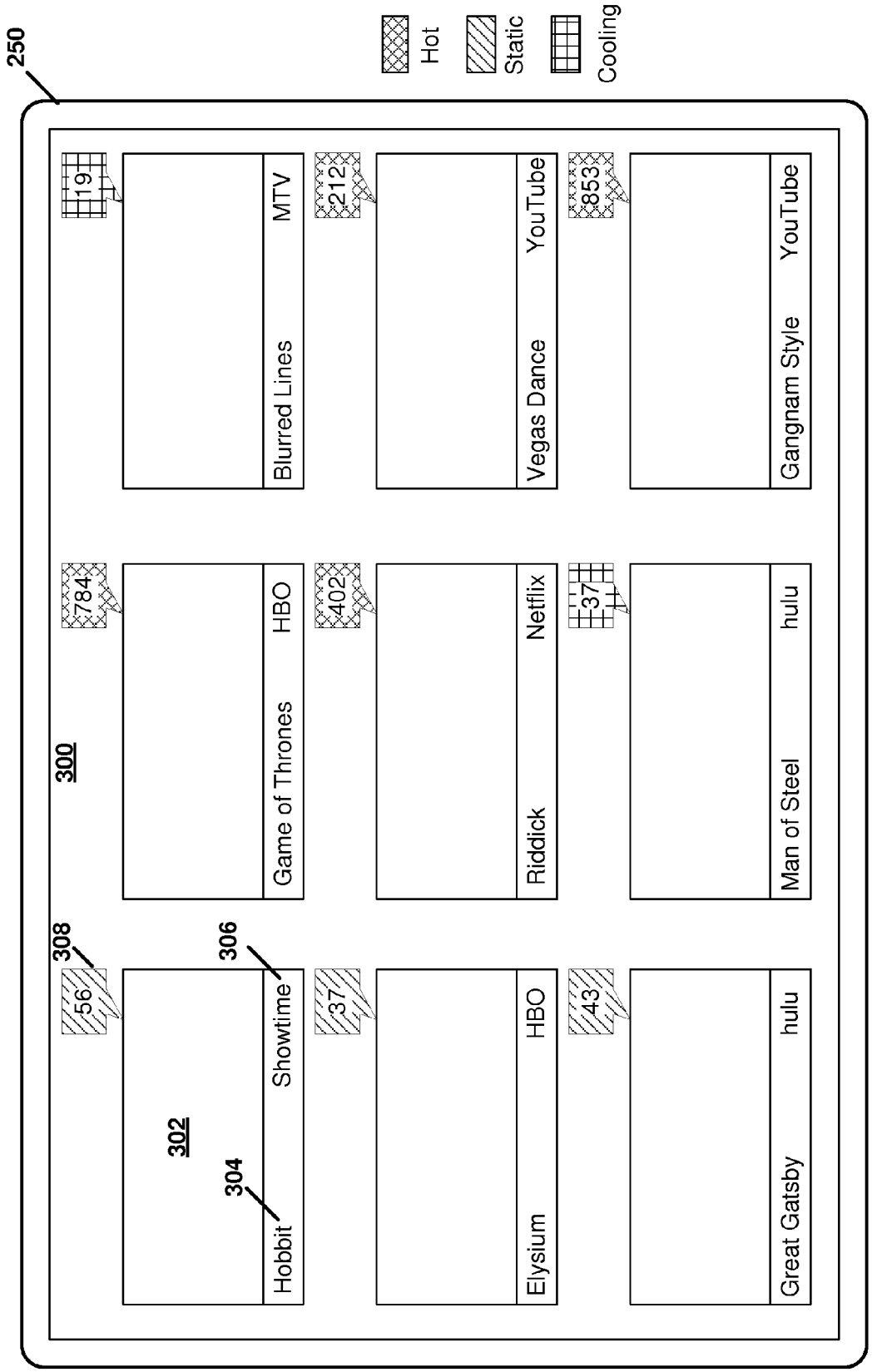
FIG. 3 is a conceptual diagram illustrating an example of a graphical user interface in accordance with one or more techniques of this disclosure.

FIG. 3 is a conceptual diagram illustrating an example of a graphical user interface in accordance with one or more techniques of this disclosure. Graphical user interface 300 represents an example of a graphical user interface that may enable a user to select content based on popularity information. As illustrated in FIG. 3, graphical user interface 300 includes a plurality of information windows 302 respectively associated with an item of content. Information window 302 may identify an available item of content and may include a high resolution image identifying an item of content (e.g., a movie poster or a production still). As illustrated in FIG. 3, each information window 302 includes a title identifier 304, a source identifier 306, and a popularity indicator 308. Title identifier 304 may identify the title of an item of content (e.g., the title of a movie or television program). Source identifier 306 may identify a source of the content. For example, source identifier 306 may identify a media service provider or a television network. Further, in an example where an information window 302 is associated with Pay Per View content available from a television service provider, source identifier 306 may include a price to access the content.

As described above, a computing device may receive a numeric value indicating the popularity ranking of available content. Popularity indicator 308 provides a user with a visual indicator of a popularity ranking. In one example, popularity indicator 308 may simply be a received numeric value. In other examples, popularity application 209 may be configured to generate a numeric value based on a received number value. For example, popularity application 209 may be configured to adjust a received numeric value based on one or more user preferences. In the example illustrated in FIG. 3, popularity indicator 308 is a numeric value indicating the popularity of a particular item of content, where a higher numeric value indicates that a higher level of popularity. In other examples, popularity indicator 308 may include a graphical indicator of popularity including, for example, a number of stars.

As further illustrated in FIG. 3, in addition to including a numeric value, popularity indicators 308 include a background pattern indicating with a particular item of content has a hot, static, or cooling status, where a hot status indicates that a particular item of content is significantly increasing in popularity, a static status indicates that a particular item of content is neither significantly increasing or decreasing in popularity, and a cooling status indicates that a particular item of content is significantly decreasing in popularity. In one example, popularity application 209 may be configured to determine whether a particular item of content has a hot status, a static status, or a cooling status based on rates of change thresholds.

As described above, the numeric value indicating the popularity ranking may be referred to as a buzz factor and an algorithm used to determine a buzz factor and the frequency at which a buzz factor is updated may be selected such that the presentation of available content within a graphical user interface varies in a manner that will make a user more or less likely to select a particular item of content. In one example, popularity application 209 may be configured to determine whether a particular item of content has a hot status, a static status, or a cooling status based on changes to a determined buzz factor. For example if a buzz factor is decreasing at a rate of five units per minute, a particular item of content may be cooling.

It should be noted that although hot, static, and cooling statuses are illustrated using patterns in FIG. 3, in practice, hot, static, and cooling statuses may be indicated using colors, e.g., hot (red), static (orange) or cooling (blue). In one example, a status indicator may be referred to as a "buzz meter." In one example, popularity application 209 may request information from content popularity site 128 in order to update popularity indicators 308. In another example, when an item of content is endorsed on a social media service, content popularity site 128 may push the updated popularity information to popularity application 209. Popularity application 209 may then update popularity indicators 308 on graphical user interface 300. In the example illustrated in FIG. 3, a user may see counter values increase or decrease and/or a statuses change for each information window 302. In one example, popularity indicators may effectively be updated in real time.

As described above, a computing device may be configured to receive user input via an I/O device. In one example, a user of computing device 200 may be able to select an information window 302 of graphical user interface 300 using I/O device 222. Graphical user interface 300 may be configured such that each information window 302 is capable of multiple levels of selection. For example, a user may be able to use an I/O device to move a cursor, where a cursor may be a visible or invisible cursor, to the location of an information window 302 and remaining on the information window 302 for a predetermined amount of time may be associated with one level of selection and activation of one or more controls on an I/O device (e.g., a single tap or a double tap on a touch-sensitive display) may be associated with other levels of selection (e.g., display information or provide a preview).

In one example, graphical user interface 300 may be configured to enable four levels of selection for each information window 302: a level that enlarges or highlights an information window 302, a level that provides information associated with information window 302 (e.g., cast and crew information), a level that provides a preview of content associated with an icon (e.g., a trailer), and a level that provides full access to content associated with an icon (e.g., play movie or television show or launch an application). In this manner, by providing graphical user interface 300 computing device 200 enables a user to select content based on popularity rankings.

Figure 4:
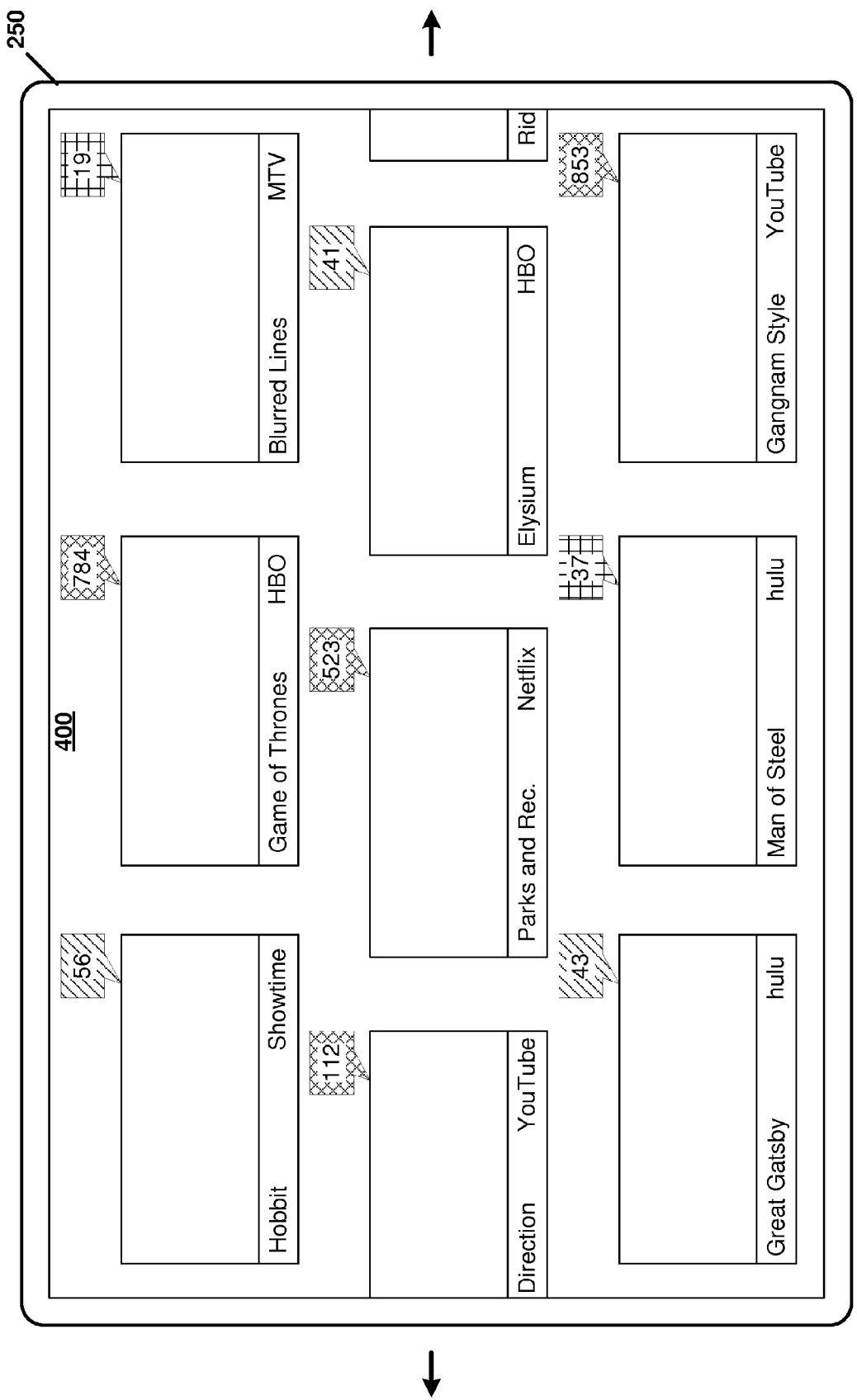
FIG. 4 is a conceptual diagram illustrating an example of a graphical user interface in accordance with one or more techniques of this disclosure.

Further, computing device 200 may be configured to enable a user to view additional items of content for possible selection. FIG. 4 is a conceptual diagram illustrating an example of a graphical user interface. Graphical user interface 400 is an example of a graphical user interface that may be provided by a computing device to implement one or more techniques of this disclosure. In one example, graphical user interface 400 may be presented to a user when a user performs a pan right command/gesture using an I/O device and/or presses a right arrow button on an I/O device while graphical user interface 300 is displayed. As illustrated in FIG. 4, information windows in the middle row of graphical user interface 300 effectively "move" to the left and new information windows appear in graphical user interface. Thus, computing device 200 may enable a user to effectively scroll through items of content by within a row. In one example, if a user continues to scroll in the same direction, information windows may "loop" back onto display 250. Further, in one example, rows of content may represent a category of content. For example, a middle row may include available movies and a bottom row may include available television shows.

Figure 5:
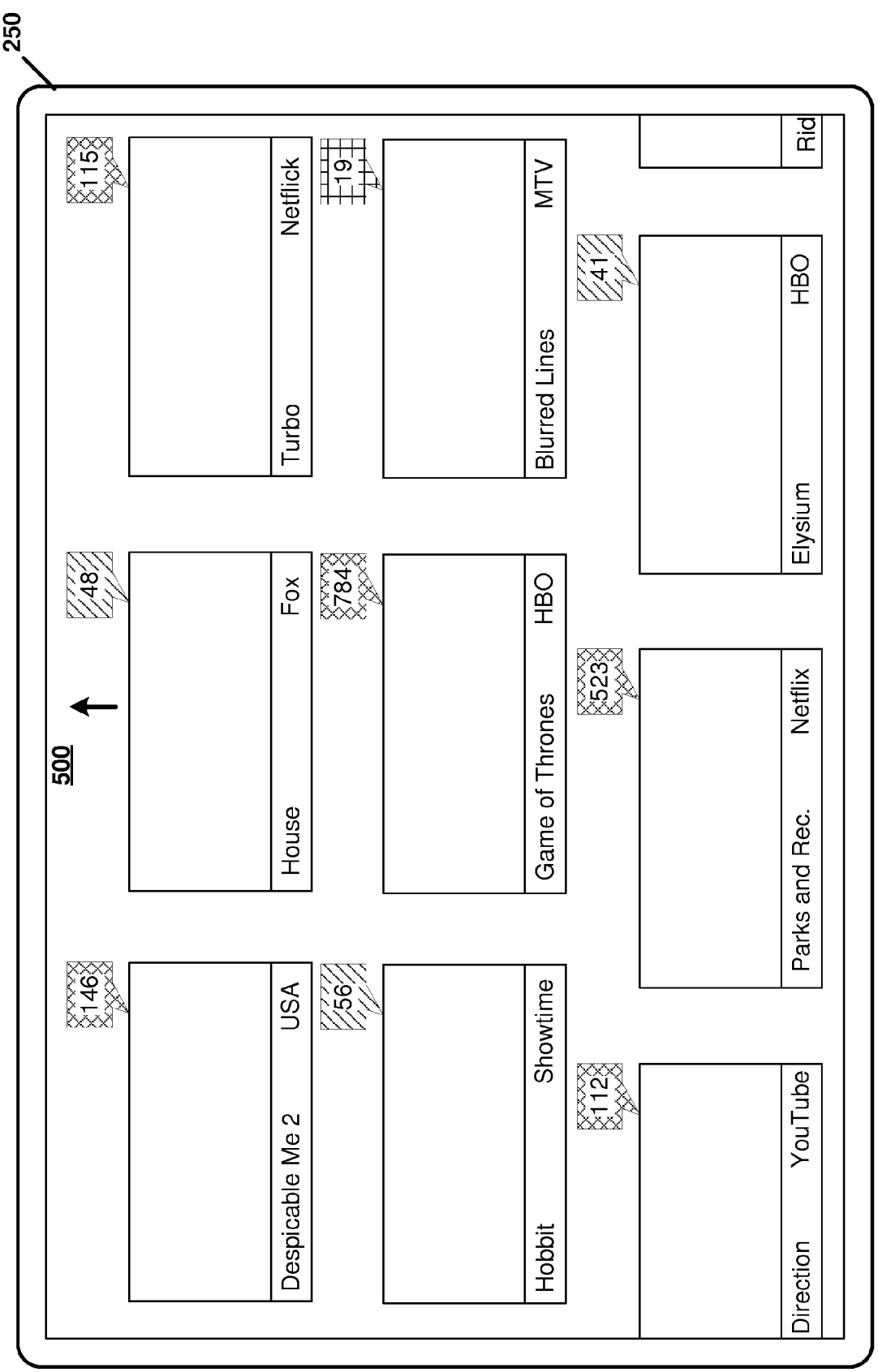
FIG. 5 is a conceptual diagram illustrating an example of a graphical user interface in accordance with one or more techniques of this disclosure.

In addition to enabling a user to scroll for items of available content by row, computing device 200 may enable a user to scroll for content vertically. FIG. 5 is a conceptual diagram illustrating an example of a graphical user interface. Graphical user interface 500 is an example of a graphical user interface that may be provided by a computing device to implement one or more techniques of this disclosure. In one example, graphical user interface 500 may be presented to a user when a user performs a pan up command/gesture using an I/O device and/or presses an up arrow button on an I/O device while graphical user interface 400 is displayed. As illustrated in FIG. 5, information windows in the middle row of graphical user interface 400 effectively "move" down and new information windows appear in graphical user interface. In one example, if a user continues to scroll in the same direction information windows may "loop" back onto display 250.

Figure 6:
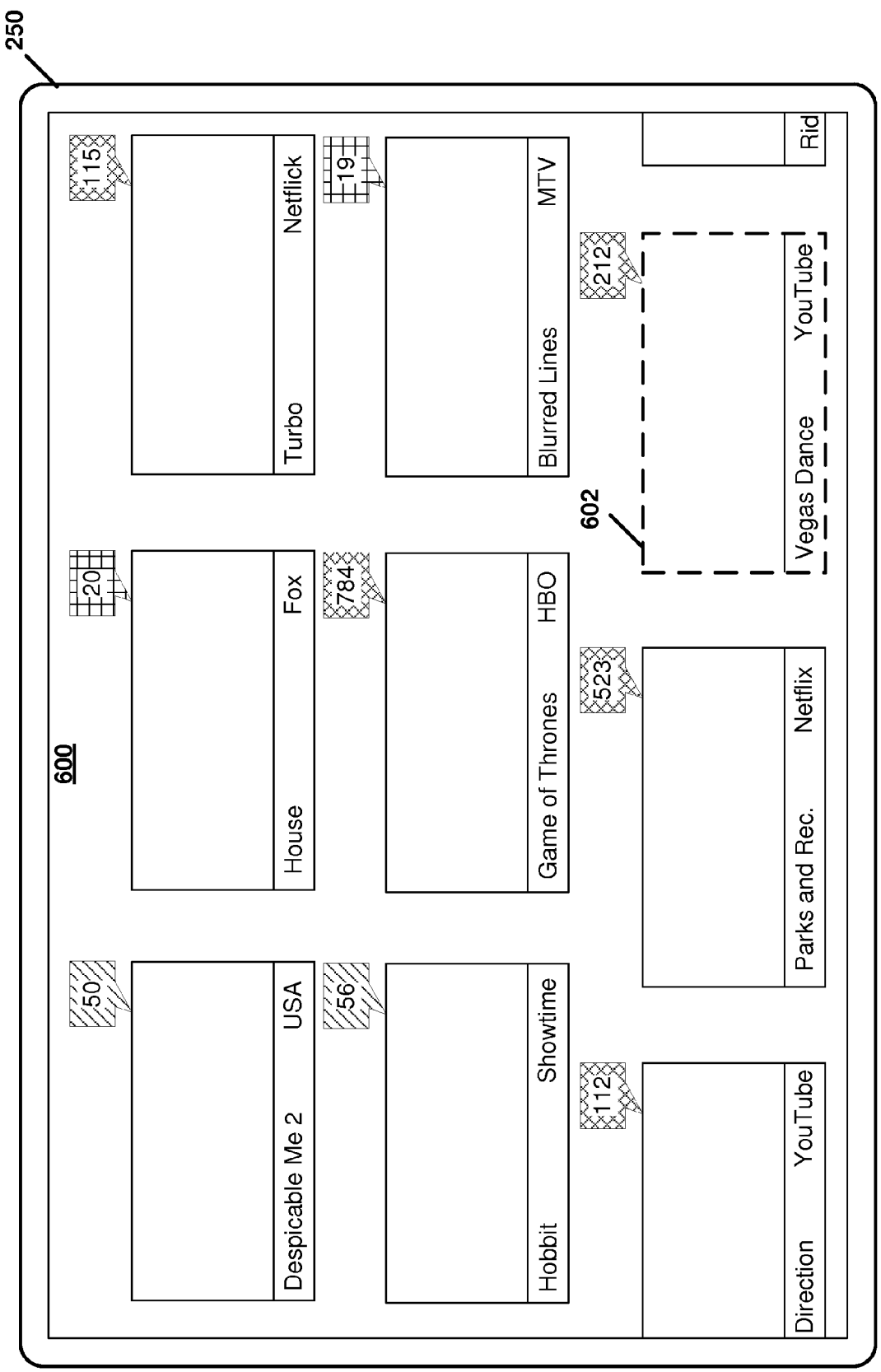
FIG. 6 is a conceptual diagram illustrating an example of a graphical user interface in accordance with one or more techniques of this disclosure.

In addition to using popularity information to generate popularity indicators 308, computing device 200 may present items of content based on popularity information. FIG. 6 is a conceptual diagram illustrating an example of a graphical user interface. Graphical user interface 600 is an example of a graphical user interface that may be provided by a computing device to implement one or more techniques of this disclosure. In one example, graphical user interface 600 may be presented after graphical user interface 500 is presented. As illustrated in FIG. 6, graphical user interface 600 includes information window 602 where information window 602 "replaces" an information window included in graphical user interface 500. In this example, popularity application 209 may determine that the item of content in graphical user interface 500 (i.e., Elysium) is unlikely to be selected by a user based on a cooling status and may replace the item of content with an item of content more likely to be selected by a user. In another example, popularity application 209 may position information windows within a graphical user interface based on a likelihood of selection. For example, more popular items of content may be initially displayed and/or positioned toward the center of a graphical user interface.

Figure 7:
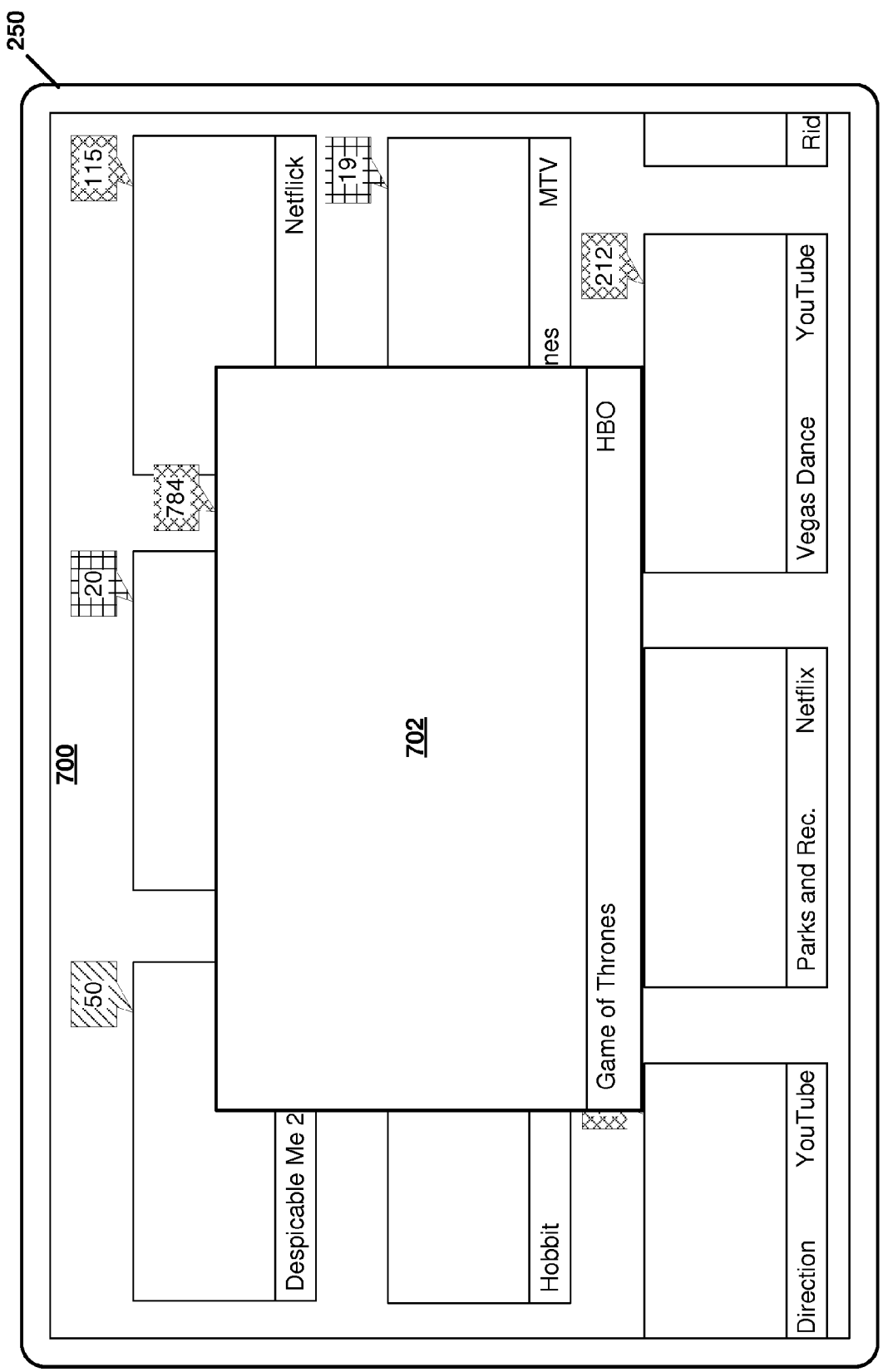
FIG. 7 is a conceptual diagram illustrating an example of a graphical user interface in accordance with one or more techniques of this disclosure.

As described above, graphical user interfaces may be configured such that each information window is capable of multiple levels of selection. FIG. 7 is a conceptual diagram illustrating an example of a graphical user interface. Graphical user interface 700 is an example of a graphical user interface that may be provided by a computing device to implement one or more techniques of this disclosure. In one example, graphical user interface 700 may be presented after graphical user interface 600 is presented. As illustrated in FIG. 7, graphical user interface 700 includes preview window 702. In one example, a user may activate one or more controls on an I/O device (e.g., a single tap or a double tap on a touch-sensitive display) to indicate a further level of selection for an information window and upon receiving a further level of selection computing device 200 may provide preview window 702. Preview window 702 may provide a video preview associated with an item of content. A video preview may include a trailer associated with an item content or in the case where an item of content includes on air content, may include the item of content in progress.

Figure 8:
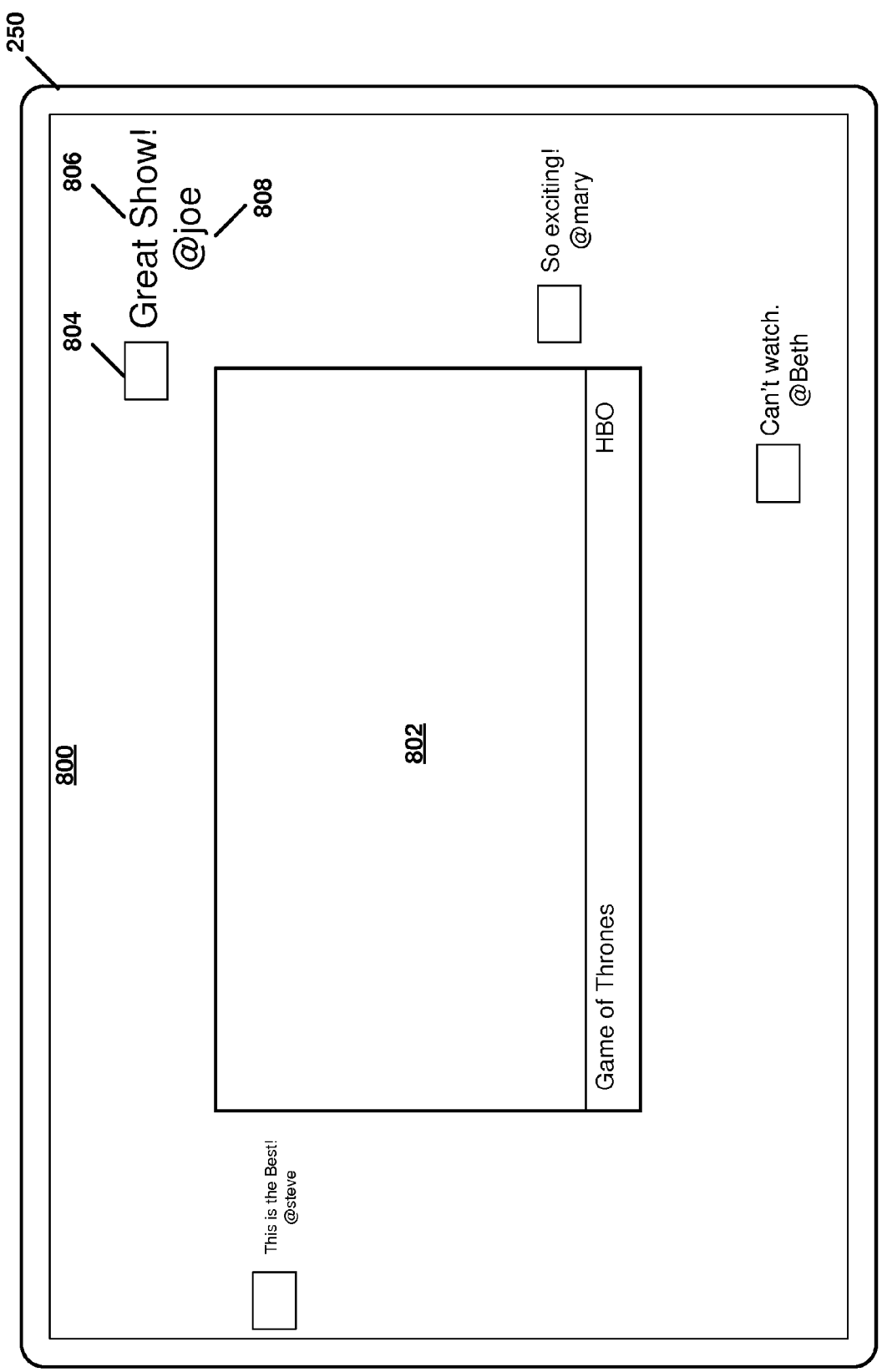
FIG. 8 is a conceptual diagram illustrating an example of a graphical user interface in accordance with one or more techniques of this disclosure.

In addition to providing a preview window when an item of content is selection, computing device 200 may be configured to display an item of content in a manner that incorporates social media data. FIG. 8 is a conceptual diagram illustrating an example of a graphical user interface. Graphical user interface 800 is an example of a graphical user interface that may be provided by a computing device to implement one or more techniques of this disclosure. In one example, graphical user interface 800 may be presented after an appropriate level of selection. For example, graphical user interface 800 may be presented to a user if a user provides an indication of an additional level of selection when a preview window is presented. In one example, an I/O device may include a dedicated button which when activated causes graphical user interface 800 to be presented.

As illustrated in FIG. 8, graphical user interface 800 includes playback window 802, and a plurality of user identifier icons 804, comments 806, and user identifier handles 808. User identifier icon 804 and user identifier handles 808 may identify particular users of a social media services. For example, user identifier icon 804 may include a profile picture associated with a user. User identifier handles 808 may include an email address, a screen name, and/or another type of identifier associated with a user of a social medial service. Computing device 200 may provide graphical user interface 800 in order to provide a user with a virtual viewing party. That is, users of computing devices 102A-102N located at different physical locations may be able to communicate while accessing an item of content. In the example illustrated in FIG. 8, playback window 802 includes an item of content that a user of computing device 200 and identified users are currently accessing. For example, playback window 802 may include a television show that is being provided by television service provider 110. Each of comments 806 may be comments provided by respectively identified users. In one example, comments may be provided by a user through a social media service. For example, comments 806 may be comments posted on Facebook and/or comments provided through a service, such as, for example Twitter (i.e., a tweet). It should be noted that although comments 806 illustrated in FIG. 8 are shown as including text, in other examples, comments 806 may also include images and videos. For example, comments 806 may include record video messages. In some examples, comments may be referred to as "buzz elements."

In the example illustrated in FIG. 8, more recent comments may appear in the foreground of graphical user interface 800 and older comments may "move" to the background of graphical user interface 800. That is, comments 806 may be shown in chronological order and may be initially displayed in the largest size. The comments may then subsequently scale down or move back in 3D space along the Z-axis over time to make room for new comments.

In one example, comments 806 may be displayed in real time (e.g., for live content) and/or time-synced for recorded or on demand content. In one example, popularity application 209 may be configured to filter comments. That is, popularity application 209 may be configured such that not all comments are displayed. For example, in the case where playback window includes a recorded program, popularity application 209 may be configured such that comments that "spoil" an item of content (i.e., provide future plot details are not displayed). Further, popularity application 209 may be configured to filter comments based on user preferences. For example, a user may wish to only receive comments from an approved list of other users.

Figure 9:
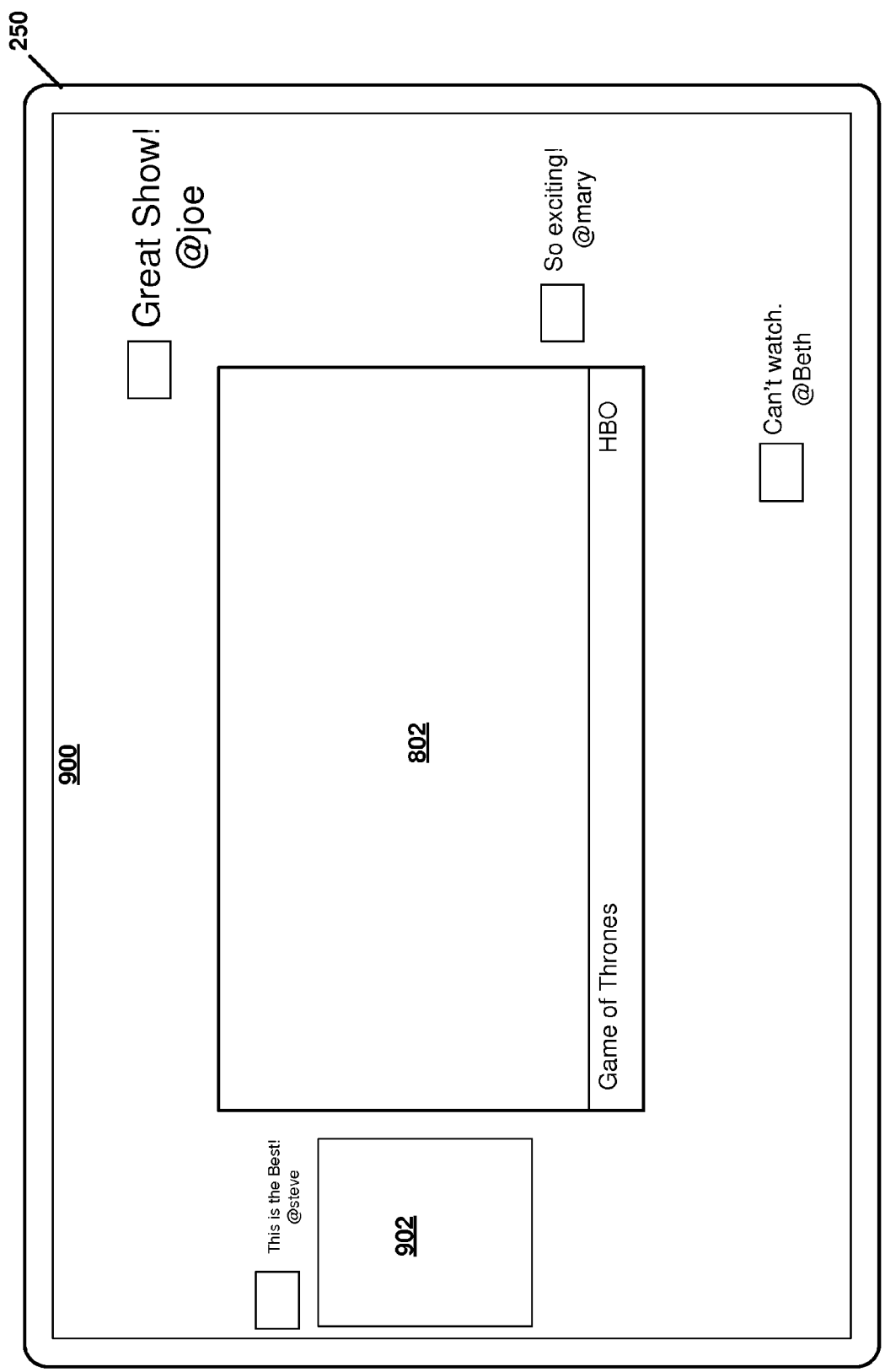
FIG. 9 is a conceptual diagram illustrating an example of a graphical user interface in accordance with one or more techniques of this disclosure.

In addition to enabling users to communicate with one another users using comments, computing device 200 may be configured to enable user to communicate with other users through a video chat. FIG. 9 is a conceptual diagram illustrating an example of a graphical user interface. Graphical user interface 900 is an example of a graphical user interface that may be provided by a computing device to implement one or more techniques of this disclosure. In one example, graphical user interface 900 may be presented after a user activates a video chat function. As illustrated in FIG. 9, graphical user interface 900 includes video chat window 902. Video chat window 902 may include video provided by another user (e.g., through a video camera). Video chat window 902 enables users "join in" on another user's content watching experience. That is, while a user is accessing content through playback window 802 another user may communicate via video chat window 902. As illustrated in FIG. 9, the playback window and video chat window 902 may be displayed in parallel so that a user may experience both simultaneously. In one example, computing device 200 may be configured such that when a user makes a comment via a video chat, the audio of the item of content included in playback window 802 is lowered until the conversation has ended. Further, once detection is made that the audio signal from the video chat has paused, the audio for the content including in playback window may resume to normal settings. In another example, a user may also toggle between videos using an I/O device to control volume level.

Figure 10:
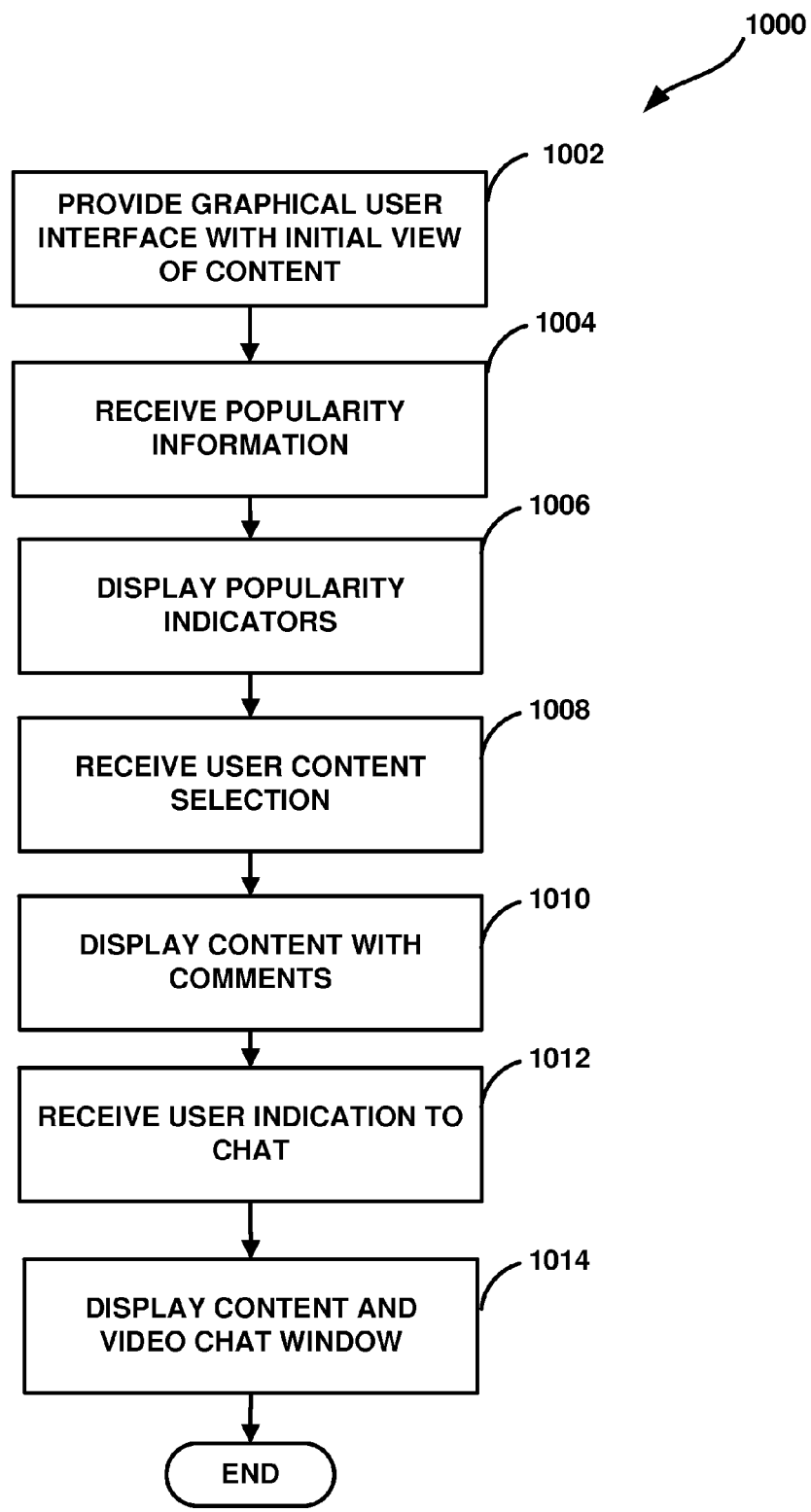
FIG. 10 is a flowchart illustrating an example method for enabling content selection according to the techniques of this disclosure.

It should be noted that a computing device may display any and all combinations of the graphical user interfaces illustrated in FIGS. 3-9 and the example descriptions of how graphical user interfaces may be presented to a user are for illustrative purposes. FIG. 10 is a flowchart illustrating an example method for enabling selection of content input according to the techniques of this disclosure.

Flowchart 1000 illustrates an example of how graphical user interfaces described herein may be presented to a user. It should be noted that although flowchart 1000 is described with respect to computing device 200, the techniques described with respect to flowchart 1000 may be performed by any and all combinations of components of computing device 200. Computing device 200 provides an initial graphical user interface to a user (1002). In one example, an initial graphical user interface may include graphical user interface 300 and may be presented to a user after a user logs-in to a profile. Computing device 200 receives a popularity information (1004). In one example, popularity information may include a numeric value indicating the popularity ranking of available content. Computing device 200 displays popularity indicators (1006). For example, computing device 200 may display popularity indicators 308 described above.

Computing device 200 receives a user content selection (1008). In one example, computing device 200 may receive a content selection from I/O device 222 and a user may indicate a content selection by highlighting an information window with a cursor and activating an I/O device control. Computing device 200 displays content with comments (1010). In one example, computing device 200 may display graphical user interface 800 described above. Computing device 200 receives a user indication to chat (1012). In one example, computing device 200 may receive an indication to chat from I/O device 222 and a user may provide an indication to chat by selecting a user identifier icon by highlighting an icon with a cursor and activating an I/O device control. Computing device 200 displays content and video chat window (1014). In one example, computing device 200 may display graphical user interface 900 described above. In this manner, computing device 200 represents an example of a device configured enable selection of content.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for enabling content selection comprising:
displaying a plurality of information windows wherein each information window is respectively associated with an item of available content;
replacing an information window of the plurality of information windows based on a determined change in popularity, while maintaining the position and size of other displayed plurality of information windows;
receiving a user selection of an information window of the plurality of information windows, the user selection corresponding to multiple different types of selection available to a user; and
in response to the user selection, causing an item of content associated with the selected window to be presented in a user interface that includes a playback window, the playback window including a display of user comments such that respective comments initially appear in the foreground of the user interface and move to the background as new comments are received.

2. The method of claim 1, wherein the determined change in popularity is based on one or more of: a number of times an item of content is requested by users during a particular time period, a number of endorsements an item of content receives through a social media service, and a number of times a query related to an item of content is provided to a search engine site.

3. The method of claim 1, wherein the determined change in popularity is calculated based on a weighted sum and wherein weights used in the weighted sum are based on user preference information.

4. The method of claim 1, wherein the multiple different types of selection include an initial type of selection that causes a preview associated with a selected item of content to be displayed and an additional type of selection that causes the selected item of content to be presented in the user interface that includes the playback window.

5. The method of claim 1, wherein the graphical user interface including the playback window further includes a video chat window.

6. The method of claim 1, wherein the multiple different types of selection include an initial type of selection that causes a preview associated with the item of content to be displayed while maintaining the position and size of the other plurality of information windows and an additional type of selection that causes the item of content to be presented in the user interface that includes the playback window.

7. A device for enabling content selection comprising one or more processors configured to perform operations comprising:
- displaying a plurality of information windows wherein each information window is respectively associated with an item of available content;
- replacing an information window of the plurality of information windows based on a determined change in popularity, while maintaining the position and size of the other displayed plurality of information windows;
- receiving a user selection of an information window from the plurality of information windows, the user selection corresponding to one of multiple different types of selection available to the user; and
- in response to the user selection, causing an item of content associated with the selected window to be presented in a user interface that includes a playback window, the playback window including a display of user comments such that respective comments initially appear in the foreground of the user interface and move to the background as new comments are received.

8. The device of claim 7, wherein the determined change in popularity is based on one or more of: a number of times an item of content is requested by users during a particular time period, a number of endorsements an item of content receives through a social media service, and a number of times a query related to an item of content is provided to a search engine site.

9. The device of claim 7, wherein the determined change in popularity is calculated based on a weighted sum and wherein weights used in the weighted sum are based on user preference information.

10. The device of claim 7, wherein the multiple different types of selection include an initial type of selection that causes a preview associated with a selected item of content to be displayed and an additional type of selection that causes the selected item of content to be presented in the user interface that includes playback window.

11. The device of claim 7, wherein the user interface that includes the playback window further includes a video chat window.

12. A non-transitory computer-readable storage medium comprising instructions stored thereon that upon execution cause one or more processors of a device to perform operations comprising:
- displaying a plurality of information windows wherein each formation window is respectively associated with an item of available content;
- replacing an information window of the plurality of information windows based on a determined change in popularity, while maintaining the position and size of the other displayed plurality of information windows;
- receiving user selection of an information window from the plurality of information windows, the user selection corresponding to mulitple different types of selection available to a user; and
- in response to the user selection, causing an item of content associated with the selected window to be presented in a user interface that includes a playback window, the playback window including a display of user comments such that respective comments initially appear in the foreground of the user interface and move to the background as new comments are received.

13. The non-transitory computer readable medium of claim 12, wherein the determined change in popularity is based on one or more of: a number of times an item of content is requested by users during a particular time period, a number of endorsements an item of content receives through a social media service, and a number of times a query related to an item of content is provided to a search engine site.

14. The non-transitory computer readable medium of claim 12, wherein the determined change in popularity is calculated based on a weighted sum of usage data and wherein weights used in the weighted sum are based on user preference information.

15. The non-transitory computer readable medium of claim 12, wherein the multiple types of selection include an initial type of selection that causes a preview associated with a selected item of content to be displayed and an additional type of selection that causes the selected item of content to be presented in the user interface that includes the playback window.

* * * * *

UNITED STATES PATENT AND TRADEMARK OFFICE
CERTIFICATE OF CORRECTION

PATENT NO. : 9,883,250 B2  
APPLICATION NO. : 14/260677  
DATED : January 30, 2018  
INVENTOR(S) : Chai et al.

Page 1 of 1

It is certified that error appears in the above-identified patent and that said Letters Patent is hereby corrected as shown below:

In the Claims

In Column 22, Line 38, in Claim 1, delete "popularity," and insert --popularity-- therefor In Column 23, Line 20, in Claim 7, delete "popularity," and insert --popularity-- therefor In Column 24, Line 11, in Claim 12, delete "formation" and insert --information-- therefor In Column 24, Line 19, in Claim 12, delete "mulitple" and insert --multiple-- therefor Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*